(12) United States Patent
Allen et al.

(10) Patent No.: US 9,514,125 B1
(45) Date of Patent: Dec. 6, 2016

(54) LINGUISTIC BASED DETERMINATION OF TEXT LOCATION ORIGIN

(71) Applicant: International Business Machines Corporation, Armonk, NY (US)

(72) Inventors: Corville O. Allen, Morrisville, NC (US); Roberto DeLima, Apex, NC (US); Andrew R. Freed, Cary, NC (US); Robert L. Nielsen, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/132,969

(22) Filed: Apr. 19, 2016

Related U.S. Application Data

(63) Continuation of application No. 14/835,914, filed on Aug. 26, 2015.

(51) Int. Cl.
*G06F 17/20* (2006.01)
*G06F 17/27* (2006.01)
*G06F 17/30* (2006.01)

(52) U.S. Cl.
CPC ......... *G06F 17/2785* (2013.01); *G06F 17/275* (2013.01); *G06F 17/3053* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 6,692,259 B2* | 2/2004 | Kumar | G10H 1/365 345/630 |
| 7,895,148 B2* | 2/2011 | Ma | G06Q 10/10 706/45 |
| 2004/0006457 A1* | 1/2004 | Dehlinger | G06F 17/2715 704/5 |
| 2004/0162824 A1* | 8/2004 | Burns | G06F 17/30707 |

(Continued)

OTHER PUBLICATIONS

Pouliquen, Bruno, et al. "Geographical information recognition and visualization in texts written in various languages." Proceedings of the 2004 ACM symposium on Applied computing. ACM, 2004.*

(Continued)

*Primary Examiner* — Jialong He
(74) *Attorney, Agent, or Firm* — Nathan M. Rau

(57) ABSTRACT

A method includes receiving a text and identifying a set of linguistic characteristics contained in the text, where linguistic characteristics include grammatical, syntactic, and idiomatic features of the text. The method also includes determining a plurality of locations of origin in which the text was potentially written based on the set of linguistic characteristics. The method also includes retrieving a set of reference documents for each location of origin in the plurality of locations of origin and producing a set of proximity scores by performing a set of proximity checks using the set of linguistic characteristics, the set of reference documents, and the text, wherein the proximity checks analyze how often and how close linguistic characteristics are to one another. The method also includes ranking the plurality of locations of origin based on the set of proximity scores and returning a set of one or more ranked locations of origin.

1 Claim, 5 Drawing Sheets

(56) References Cited

U.S. PATENT DOCUMENTS

| | | | | |
|---|---|---|---|---|
| 2005/0234991 | A1* | 10/2005 | Marx | G06F 17/3087 |
| 2007/0239433 | A1* | 10/2007 | Chaski | G06F 17/27 |
| | | | | 704/9 |
| 2007/0294199 | A1* | 12/2007 | Nelken | G06F 17/2705 |
| | | | | 706/50 |
| 2009/0024661 | A1* | 1/2009 | Kelliher | G06F 17/30241 |
| 2009/0300046 | A1* | 12/2009 | Abouyounes | G06F 17/30265 |
| 2010/0114562 | A1 | 5/2010 | Hutchinson et al. | |
| 2010/0179754 | A1* | 7/2010 | Faenger | G06F 17/3087 |
| | | | | 701/532 |
| 2011/0264655 | A1* | 10/2011 | Xiao | G06F 17/30616 |
| | | | | 707/728 |
| 2012/0271624 | A1* | 10/2012 | Chen | G09B 29/106 |
| | | | | 704/9 |
| 2015/0309974 | A1 | 10/2015 | Brav et al. | |

OTHER PUBLICATIONS

Roller, Stephen, et al. "Supervised text-based geolocation using language models on an adaptive grid." Proceedings of the 2012 Joint Conference on Empirical Methods in Natural Language Processing and Computational Natural Language Learning. Association for Computational Linguistics, 2012.*

* cited by examiner

LINGUISTIC BASED DETERMINATION OF TEXT LOCATION ORIGIN

BACKGROUND

The present disclosure relates to text analysis, and more specifically, to the determination of the location of origin of a text.

Text analysis is a detailed examination of the elements and structure of a text document to derive information related of the text in question. Text may be broken down and examined in various ways. Various things may be learned about different aspects of a text through text analysis, and various conclusions may be reached.

SUMMARY

According to embodiments of the present disclosure, a computer implemented natural language processing method includes receiving a text. The method also includes identifying a set of linguistic characteristics contained in the text, where linguistic characteristics include grammatical, syntactic, and idiomatic features of the text. The method also includes determining a plurality of locations of origin in which the text was potentially written based on the set of linguistic characteristics. The method also includes retrieving a set of reference documents for each location of origin in the plurality of locations of origin, in response to the determining the plurality of locations in which the text was potentially written. The method also includes producing a set of proximity scores by performing a set of proximity checks using the set of linguistic characteristics, the set of reference documents, and the text, wherein the proximity checks analyze how often and how close linguistic characteristics are to one another. The method also includes ranking the plurality of locations of origin based on the set of proximity scores. The method also includes returning a set of one or more ranked locations of origin of the plurality of locations of origin. Other embodiments relate to a system and a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
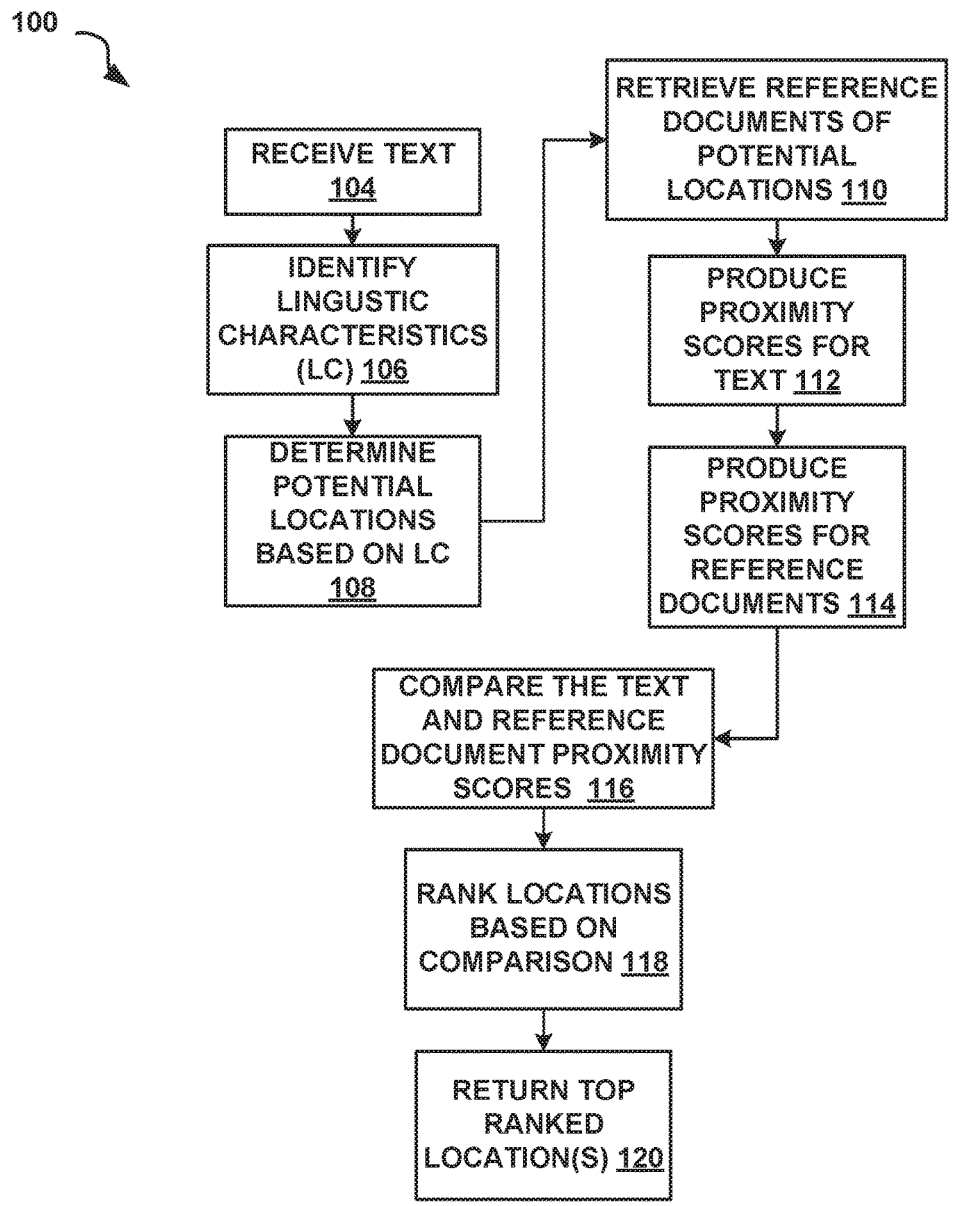
FIG. 1 depicts a general flowchart of determining the location of origin of a text, according to various embodiments.

While embodiments described herein are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to text analysis, and more specifically, to the determination of the location of origin of a text. While the present disclosure is not necessarily limited to such applications, various aspects of the disclosure may be appreciated through a discussion of various examples using this context.

The location of origin of a text is a piece of data that may give one various insights into the text, including the context in which it was created, among other things. The location of origin is the place where the text was written. A set is any number of a particular thing. Existing processes may not faithfully reproduce the location of origin of the text. For example, many systems scan documents imported with optical character recognition (OCR) or text snippets copied or pasted from other sources. Additionally, a text may originate from a transcription of spoken word, which may not include a location or origin on the text itself.

The present disclosure describes a computer, system, or methods, parsing out linguistic characteristics from a text. From analysis of those linguistic features, potential locations of origin that text originated from are ranked by which are the most likely.

The present disclosure discloses various methods, systems, and computer program products configured to accurately locate the origin of a text by analyzing the text and parsing it into pieces that represent different linguistic characteristics, according to various embodiments. These linguistic characteristics are compared against numerous reference documents, or "gold set" documents, permitting the ranking of potential locations of origin of the text, according to various embodiments.

According to various embodiments, dialect and language characteristics may be used to determine where a text (e.g., a document, transcript, blog post, article, etc.) was written. As described herein, a computer may determine where the text was written by associating the linguistic characteristics with a location of origin. Then, the computer cross-references the linguistic characteristics against other highly correlated similar statements across a broad collection of texts to narrow down the potential locations of origin. Similar statements may include spelling variations, phrasing variations, and other indicators. Examples of texts may include, but are not limited to, social media, literature, government documents, journals, and textbooks. Some of these texts are noted either by an explicit publication city or country, visible or otherwise. The present disclosure could be used to supplement such analysis, according to various embodiments.

Various described processes may utilize a computer that is configured to process key features of dialect changes over small variations of region or location of origin. Variations in location of origin may be defined in terms of social language. World events may also aid in determining the location of origin of a text, as various events utilize a very particularized form of language, or create a new phrase altogether for specific locations of origin in the world. Various changes in the language may also be taken into consideration. The changes in the language are often in use of phonology, grammar, vocabulary, jargons, slangs, digital-identifiers (such as hashtags), short hand, and acronyms.

For example, if how a word was pronounced, the way it was used in a sentence, or the meaning of the word changed, then such moments would be markers for change in the language as a whole. The addition of terms like "meme," "I've made a huge mistake," and "courage wolf" into the language can be found and categorized based on the location of origin of the first existence of the term and the definition of the words. Likewise, abbreviations, shorthand notation, initials, and acronyms such as "ALS" for "amyotrophic lateral sclerosis" and "BTW" for "by the way" are distinct and the popularity of their use and their meaning can be tracked. Similarly, certain jargons and slang, such as "not enough sense to pound sand down a rat hole," which are prominently used during particular locations of origin or came into existence at particular times. Some phrases may virtually cease usage outside of a certain location of origin, creating a presumption that if a phrase is found, it is highly likely that the text containing the phrase was created in that specific location of origin. Another example would be particular phrases, such as "ducky shincracker," were predominately used in particular locations of origin and could be weighed against other terms from other locations of origin in the document.

A set of dialect or linguistic terms, phrases, and forms may be categorized and noted, based on a set of existing documents. When found, the location of origin could be as small as a county or city, or less, to as large states or countries for more obscure or less documented characteristics.

According to various embodiments, described processes may be advantageous as a language identification service. The language identification service may serve as a document origin service. The language identification service may take a small portion of a document and attempt to categorize it into locations of origin based on the linguistic characteristics.

In one embodiment, a set of dialect or linguistic terms, phrases, and forms are categorized and then noted, based on a set of existing documents or training data. The form, the linguistic format of the phrases, is denoted. When found, the forms are then used to train a system to match against a specific location of origin where the document would likely have been written or originated, according to various embodiments.

The linguistic characteristics may be checked against a hundred, thousand, million, or more reference texts depending on the location of origin and available resources. The more data available for a given linguistic characteristic, the more precise the computer can be, according to various embodiments. The relation between available references and the preciseness of the location of origin may be most pronounced in social data due to numerous iterations and highly specific linguistic characteristics, which may be related to news events or popular culture.

Additional embodiments could employ a computer, as described herein, to identify sources of the text documents. As noted, the sources of documents 218 include, but are not limited to, the author, publisher, location of origin, region, and editor. By identifying linguistic characteristics that are more prominent in certain regions or locations of origin, the process could create a ranked list of the top locations of origin of the document.

For example, if a given text document makes reference to "hot dish" recipes, "loons," and "the Twin Cities," then the computer could identify those as linguistic characteristics more prominent in the upper Midwest of the United States of America, especially the state of Minnesota. This embodiment uses a similar computer as to the dating computer, and changes the parameters slightly.

In another example, the phrase "not enough sense to pound sand down a rat hole" was prominent in the state of New York. The phrase is not often found outside of New York. The computer could identify the phrase and note that the text, or at least the author, has a heavier correlation with the state of New York. Because of this correlation, the computer would rank New York higher.

Similarly, if a text contains the phrase "mony a mickle maks a muckle" as well as the word "dodderman," then the computer would identify both as linguistic characteristics. "Mony a mickle maks a muckle" is a regional phrase from Scotland, and "dodderman" is a regional slang word from Norfolk or Suffix. Based on this information, the computer would rank the source of the text to be from the mainland of the United Kingdom, but does not have enough information to clearly differentiate between Scotland, Norfolk, and Suffix. To get more specific, the computer would require more reference documents or more linguistic characteristics to analyze. Thus, the computer returns a suggested target location of origin of mainland United Kingdom.

FIG. 1 depicts a general flowchart 100 of determining the location of origin of a text, according to various embodiments.

A computer begins the process by receiving a text at operation 104. According to various embodiments, the text may include, but is not limited to, government documents, textbooks, literature, poetry, personal letters, tweets, various texts, instant messages, other documents, or anything on which language is memorialized or written. A greater quantity of text, and therefore a greater quantity of words and characters, would generally lead to more linguistic characteristics, and more comparison points further along the process for scoring. In other words, more text to analyze may lead to a more accurate analysis of a text. However, distinctive characteristics may have an even greater impact on the accuracy of analysis, especially if a highly specific term is found in the text.

Then, the computer analyzes the text and identifies what language the text is written in, and what linguistic characteristics are contained within the text at operation 106 using natural language processing and/or keyword searches, according to various embodiments. Linguistic characteristics may be linguistic, grammatical, syntactic, or idiomatic features of the text. These linguistic characteristics are either inputted by a user or learned through natural language processing. Examples of these linguistic characteristics can be found in embodiments described in FIG. 2, for example, and may generally relate to word choice and word use, as described herein.

Based on the linguistic characteristics identified, the computer determines a set of potential locations of origin at operation 108. Each linguistic characteristic is associated with different locations of origin. The set of potential locations of origin includes all locations of origin that match with at least one identified characteristic from the text.

Additionally each location of origin has a set of reference documents that may be used as example documents representing those locations of origin. The reference documents may be stored on the computer or retrieved from a network or the internet. The reference documents for each of those locations of origin are gathered at operation 110. For each location of origin that has an identified linguistic characteristic, the computer retrieves all of the reference documents associated with that location of origin for use in scoring. The computer runs a preliminary check of all locations of origin in which an identified linguistic characteristic is found at operation 106.

Once the computer has both the text and the reference documents, the computer performs a series of proximity checks comparing the linguistic characteristics with the text that produces a set of proximity scores at operation 112. Proximity checks analyze how often and how close linguistic characteristics are to one another. The proximity checks may assess how the linguistic characteristics are used and placed within the text. The proximity score may examine how far a linguistic character is placed from another in the text or how many linguistic characteristics are present with certain criteria. The more prominent those linguistic characteristics are, and the closer the linguistic characteristics are, then therefore the higher the score from the proximity check. From the proximity checks, the computer produces a proximity score for the text at operation 112, which indicates how weak or strong an identified linguistic characteristic is used in the text.

Similarly, the computer performs a series of proximity checks comparing the linguistic characteristics with the reference documents that produces proximity scores for each of the reference documents at operation 114. The proximity checks could look at how the linguistic characteristics are used and placed. From the proximity checks, the computer produces a proximity score for each of the reference documents at operation 114, which indicates how weak or strong an identified linguistic characteristic is used in each of the reference documents.

Using the proximity scores from the text document and the proximity scores for each of the reference documents, the computer compares the values at operation 116. The more the two values correlate, then the more the linguistic characteristic is being similarly used and placed in the reference documents and the text document. The computer ranks the locations of origin at operation 118. The higher the correlation of the proximity scores of the reference documents and the text, then the higher the ranking of the locations of origin. Similarly, the lower the proximity scores of the reference documents and the text, then the lower the ranking of the locations of origin. All of the locations of origin are ranked based on their scores at operation 118, according to various embodiments.

The computer returns a list of the top ranked potential locations of origin of the document at operation 120. The returned list of ranked locations of origin is based on the ranking, which are in turn based on the scores. According to various embodiments, the returned list may be as long as the user sets. For example the list could be the single highest ranked locations of origin, the top three, or the top 100. The list is returned via an audio or visual user interface, according to various embodiments.

Figure 2:
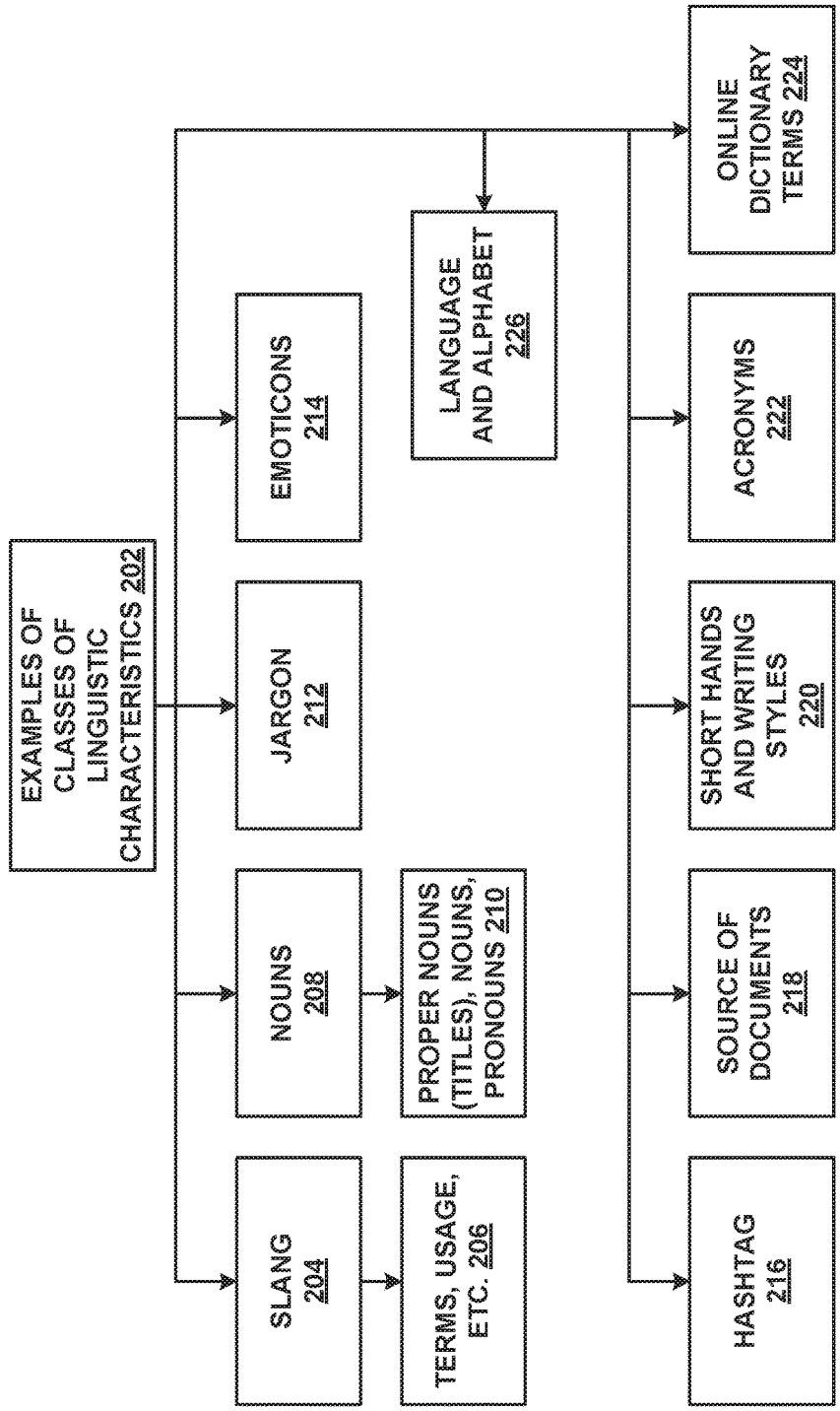
FIG. 2 depicts examples of classes of linguistic characteristics, according to various embodiments.

FIG. 2 depicts examples of classes of linguistic characteristics 202, according to various embodiments.

Classes of linguistic characteristics may include, but are not limited to: slang terms 204, nouns 208, jargon 212, emoticons 214, hashtags 216, sources of documents 218, shorthand writing and styles 220, acronyms 222, online dictionary resources 224, and the language and alphabet of the text 226.

Slang terms 204 are expressions that not found traditionally in a language. Slang terms include, but are not limited to, the terms and usage 206 of those expressions. For example, in the 1940s, the term "ducky shincracker" referred to someone who is talented at dancing, and the term is not often heard nor written outside of the 1940s, leading to a higher correlation with the 1940s.

Nouns 208 are words used to identify particular people, places, or things. Nouns include, but are not limited to, proper nouns (titles), nouns, and pronouns 210. For example, in the sentence, "Mr. Wash goes to Smithington," "Mr." is a title, "Wash" is a proper noun for a person's name, and "Smithington" is a proper noun for a place's name.

Jargon 212 is a word or expression that specialists and professionals in a specific field used to denote things specific to their field. For example, a police officer would refer to someone suspected for a crime as a "suspect," or a specialist in Greek culture could be familiar with the word "omphaloskepsis," which is of Greek origin.

Emoticons 214 are representations of facial expressions created by combining letter, numbers, and other characters a computer can create. For example ":)" is used to represent a smiling face, and similarly ":(" is used to represent a frowning face. The design of emoticons may become more abstract and creative using other characters, such as ">:[" representing an angry face.

Hashtags 216 are sets of words generally preceded by a "#," which denote specific groups or topics. For example, hashtags such as "#waitforit" and "#fail" refer to media and popular culture, whereas "#cafe" refers to the location the hashtag originates from.

Sources of documents 218 include, but are not limited to, the author, publisher, place of origin, and editor. For example, English word choice and/or sentence structure in the United States would vary slightly from word choice in the United Kingdom and even still from word choice in India. These differences may be subtle characteristics that may also be analyzed to determine a geographic origin of a text.

Shorthand writing and styles 220 are alternate forms of writing and notation used to be more efficient or clearer. Similarly, acronyms 222 are abbreviations of nouns to sets of letters given the same meaning. For example, ALS for "amyotrophic lateral sclerosis" and "BTW" for "by the way" are smaller on the page, easier to type, and easier to read, which make them convenient in general use.

Online dictionary resources 224, and other online encyclopedias, are databases found on the internet that have compiled and elaborated on words, terms, and expressions. For example, "Wikipedia" often has an entry on most topics, and online dictionaries have numerous definitions for all words. Other databases, such as search engines, encyclopedias, and academic publications could be used depending on the subject matter and specificity needed.

The language and alphabet of a text 226 are the words, letters, and spelling of words that are used. For example, in the United States, "color" would be used, whereas in the United Kingdom, "colour" is preferred. Whether the text is written in English, Chinese, or any other language may be an important feature of the text.

Figure 3:
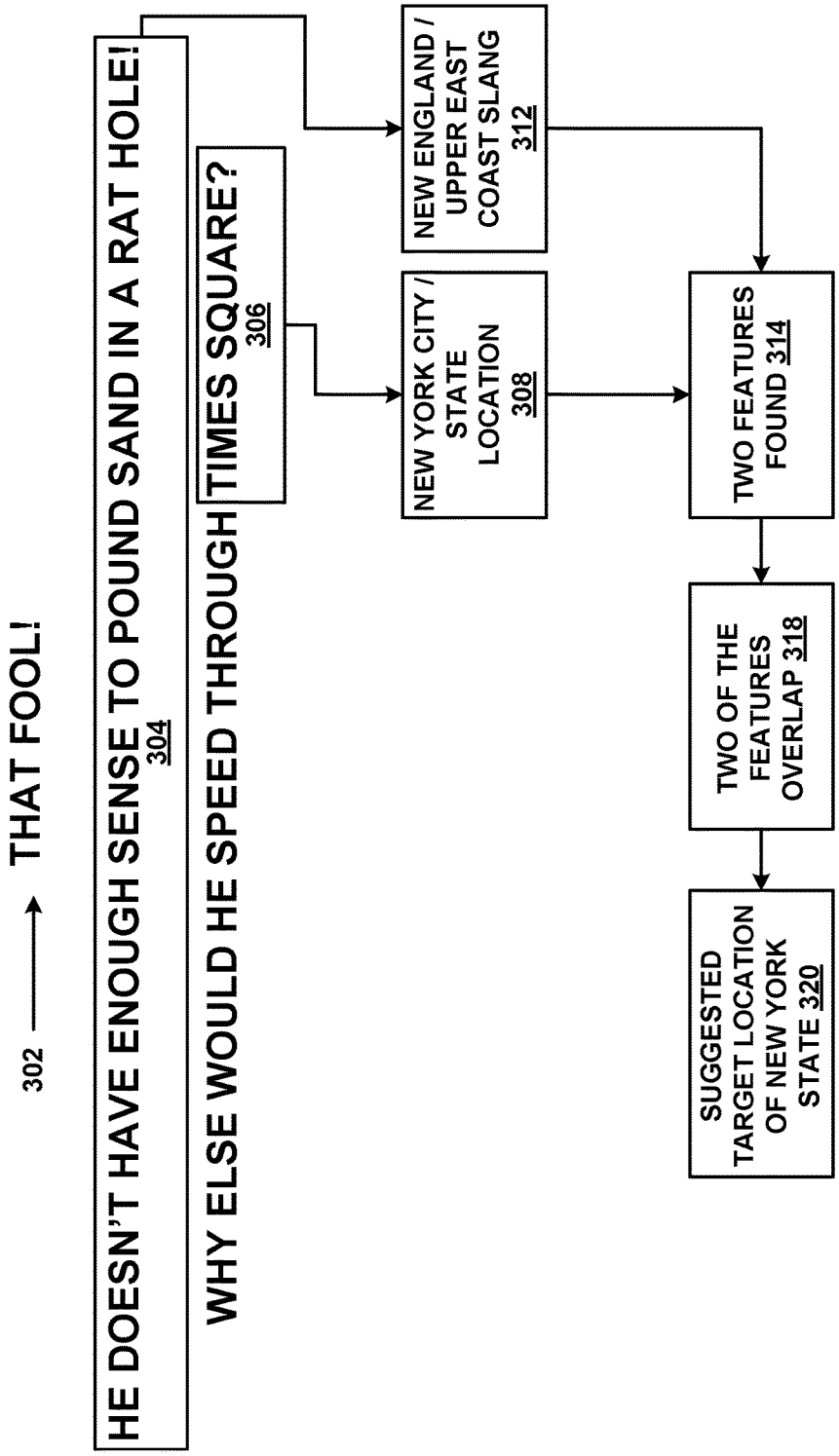
FIG. 3 depicts the use of proximity checks on an example sentence, according to various embodiments.

FIG. 3 depicts the use of proximity checks on an example sentence 302, according to various embodiments.

In one embodiment, one of the proximity checks may be a proximity check based on dating of the linguistic characteristic and how close the features for the text are, by date. A proximity check based on dating would show a likelihood the linguistic characteristics relate based on the locations of the linguistic characteristics within the text. This embodiment may similarly be done with the reference documents.

According to various embodiments, one of the proximity checks may be a proximity check based on the placement of the linguistic characteristics in the text and how close those are in placement to any other characteristics found within the text. A proximity check based on placement would show a likelihood the documents correlate based the placement use of the linguistic characteristics. These embodiments may similarly be done with the reference documents.

In the example sentence 302, the computer identifies two linguistic characteristics out of the example sentence 302: "HE DOESN'T HAVE ENOUGH SENSE TO POUND SAND DOWN A RAT HOLE" at operation 304; and "TIMES SQUARE" at operation 306. The computer registers "HE DOESN'T HAVE ENOUGH SENSE TO POUND SAND DOWN A RAT HOLE" as New England and upper East Coast slang at operation 312. The computer registers "TIMES SQUARE" as being a prominent location in New York City at operation 308. The computer has found two features at operation 314, and notes an overlap in the target location of origin at operation 318 since there is information indicating the upper East Coast as well as New York City. Thus, the computer suggests a target location of origin of New York City at operation 320 due to the agreement in location of origin of the linguistic characteristics. Also ranked would be New York State, and neighboring states such as New Jersey.

Figure 4:
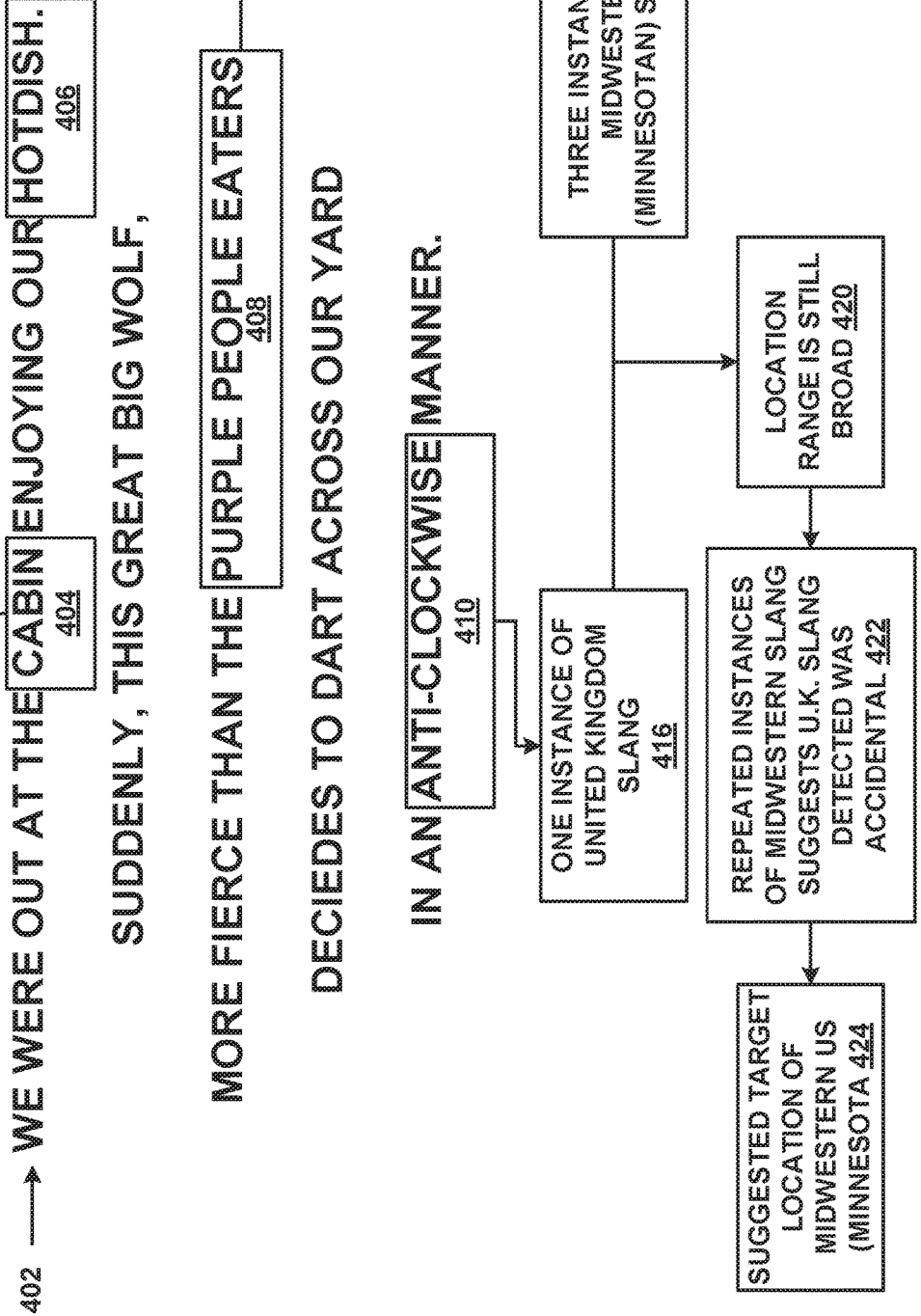
FIG. 4 depicts an embodiment of a disclosed process, including the use of proximity checks on an example sentence, according to various embodiments.

FIG. 4 depicts an embodiment of a disclosed process, including the use of proximity checks on an example sentence 402, according to various embodiments. Additionally FIG. 4 depicts an example of the disclosed process when an accidental detection occurs at operation 422.

In the example sentence 402, six linguistic characteristics have been identified: "CABIN" 404 is registered as Midwestern slang at operation 418; "HOTDISH" 406 is registered as Midwestern slang, specifically Minnesotan, at operation 418; "PURPLE PEOPLE EATERS" 408 is registered as Midwestern slang, specifically Minnesotan, at operation 418; and "ANTI-CLOCKWISE" 410 is registered as United Kingdom jargon at operation 418. The computer notes this range as being broad at operation 420. The heavy indication that the document is from the Midwest, specifically Minnesota, due to the numerous instances of slang within close proximity to one another leads the computer to consider that the single instance of United Kingdom jargon was accidental at operation 422 and should not be counted. The computer records that the text could be from the United Kingdom, but notes that there is a significantly higher correlation with the Midwest, specifically Minnesota, due to the amount of instances of Minnesota slang and their proximity to one another. This higher correlation with the Midwest leads the computer to consider that the instance of United Kingdom slang was accidental. Finally, the computer suggests a target location of origin of somewhere in the Midwest, specifically Minnesota, at operation 424, but also has the United Kingdom onward as a lower ranked possibility.

Figure 5:
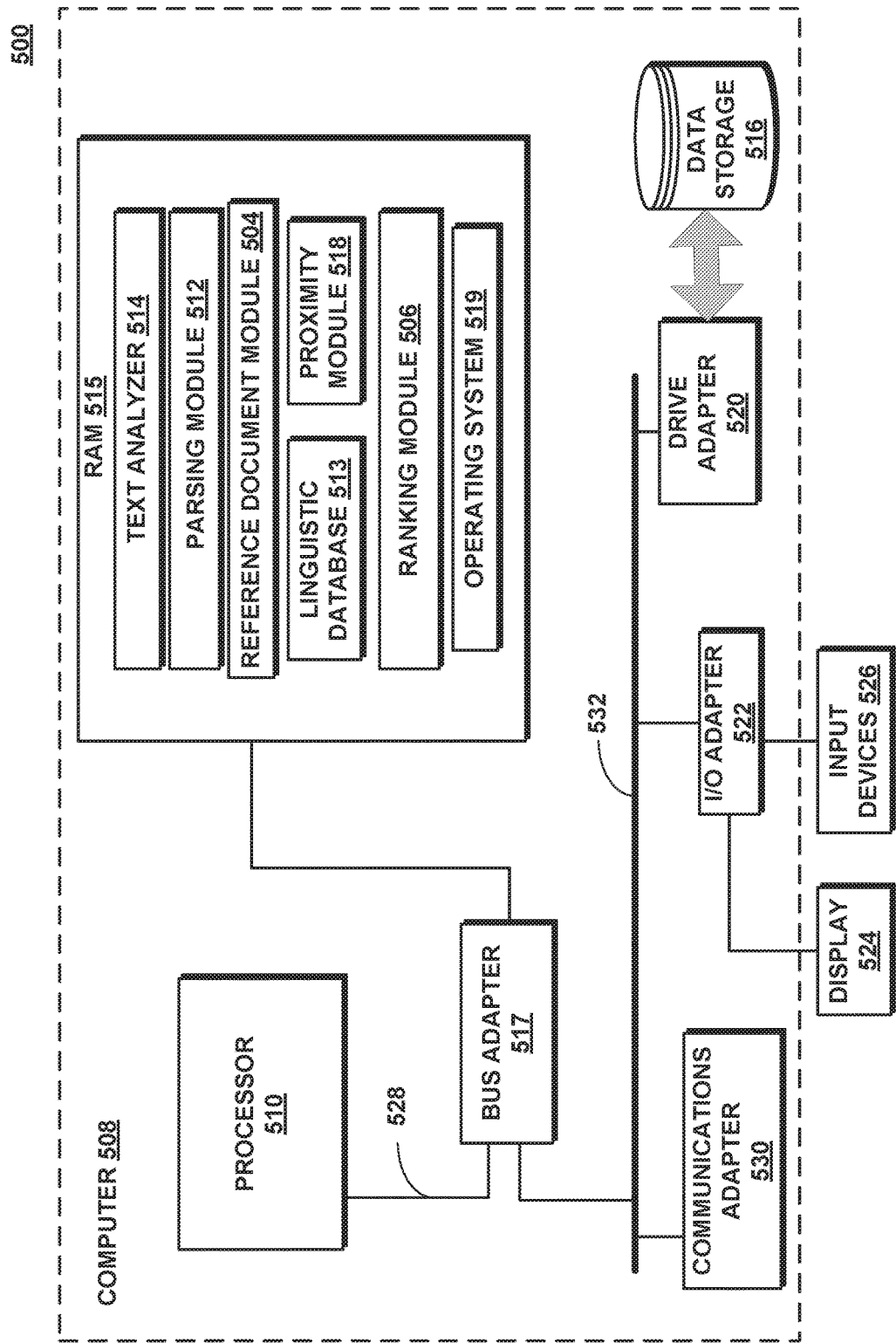
FIG. 5 illustrates a block diagram of automated computing machinery, according to various embodiments.

FIG. 5 illustrates a block diagram of automated computing machinery 500, according to various embodiments.

The computing machinery may include example computer 508 useful in performing aspects of the disclosure, according to various embodiments. The computer 508 of FIG. 5 includes at least one computer processor 510 or central processing unit (CPU) as well as random access memory 515 (RAM) which is connected through bus adapter 517 to processor 510 and to other components of the computer 508. The computing machinery 500 or the processor 510 may include one or more computer processing circuits.

The RAM 515 may include a text analyzer 514, a parsing module 512, a reference document module 504, a linguistic database 513, a proximity module 518, a ranking module 506, and an operating system 519.

The RAM 515, as described herein, may include a text analyzer 514. Texts to be analyzed, texts that have been analyzed, and other related data may be stored to or read from data storage 516, which may be a hard disk drive, according to various embodiments. The parsing module 512 may be in communication with text analyzer 514. The reference document module 504 may be in communication with the text analyzer 514. The linguistic database 513 and the proximity module 518 may be in communication with the reference document module 504, the parsing module 512, and the text analyzer 514. The linguistic database 513 may be internal as shown, or may be in storage externally. The ranking module 506 may be in communication with the linguistic database 513, the proximity module 518, and the text analyzer 514, according to various embodiments.

The RAM 515 may include an operating system 519. The operating system 519 is shown in RAM 515, but many components of such software typically are stored in non-volatile memory also, such as, for example, on a disk drive 516.

The computer 508 may also include disk drive adapter 520 coupled through expansion bus 532 and bus adapter 517 to processor 510 and other components of the computer 508. Disk drive adapter 520 connects non-volatile data storage to the computer 508 in the form of disk drive 516. Disk drive adapters useful in computers include Integrated Drive Electronics ('IDE') adapters, Small Computer System Interface ('SCSI') adapters, Serial AT Attachment ('SATA'), and others. Non-volatile computer memory also may be implemented for as an optical disc drive, electrically erasable programmable read-only memory (so-called 'EEPROM' or 'Flash' memory), RAM drives, etc. The data storage 516 may include one or more storage devices in a tiered or non-tiered configuration.

The example computer 508 may include one or more input/output (I/O) adapters 522. I/O adapters implement user-oriented input/output through, for example, software drivers and computer hardware for controlling output to display devices such as computer display screens 524, as well as user input from user input devices 526 such as keyboards, mice, styli, or touchscreens, according to various embodiments. The example computer 508 may include a video adapter at 522, which is an example of an I/O adapter specially designed for graphic output to a display device 524 such as a display screen or computer monitor. The video adapter (I/O) would be connected to processor 510 through a bus adapter 517, and the front side bus 528, which is also a high-speed bus.

The example computer 508 includes a communications adapter 530 for data communications with other computers, for example, mobile devices, and for data communications with a data communications network. Such data communications may be carried out serially through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of skill in the art without departing from the scope and spirit of the described embodiments. The terminology used herein was chosen to best explain the principles of the embodiments, the practical application or technical improvement over technologies found in the marketplace, or to enable others of skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented natural language processing method, comprising:

receiving, by a processor, a text, wherein the text is able to be broken down into parts;

identifying, by the processor parsing the text using natural language processing, a language of the text and a set of linguistic characteristics of the language contained in the text, wherein the linguistic characteristics include grammatical features, syntactic features, idiomatic features, slang, nouns, jargon, emoticons, hashtags, sources of documents, short hand, writing styles, acronyms, and online dictionary and encyclopedia terms, wherein the set of linguistic characteristics include a first linguistic characteristic and a second linguistic characteristic;

retrieving a set of reference documents, wherein the reference documents include social media, literature, government documents, and text books;

determining a plurality of locations of origin in which the text was potentially written based on (a) the set of linguistic characteristics identified in the text, and (b) the set of reference documents, wherein the plurality of locations of origin including a first location of origin corresponding to the first linguistic characteristic, and a second location of origin corresponding to the second linguistic characteristic;

determining that at least a portion of the first location of origin overlaps with at least a portion of the second location of origin, and the first location of origin is within an area defined by the second location of origin;

ranking the plurality of locations of origin, wherein the first location of origin is ranked higher than the second location of origin based on the determined overlap of the first location of origin and the second location of origin and the first location of origin being within an area defined by the second location of origin; and returning, via a user interface, a set of one or more ranked locations of origin of the plurality of locations of origin, wherein the set of one or more ranked locations of origin include a number of ranked locations of origin, and wherein the number of ranked locations of origin does not exceed a maximum number of ranked locations of origin set by a user.

* * * * *